United States Patent

Nyffenegger

(12) United States Patent
(10) Patent No.: US 7,719,401 B2
(45) Date of Patent: May 18, 2010

(54) TEMPERATURE PROBE AND METHOD OF MAKING THE SAME

(75) Inventor: Johannes Friederich Nyffenegger, Laguna Niguel, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1057 days.

(21) Appl. No.: 11/411,511

(22) Filed: Apr. 26, 2006

(65) Prior Publication Data

US 2007/0252672 A1    Nov. 1, 2007

(51) Int. Cl.
*H01C 3/04* (2006.01)

(52) U.S. Cl. ............................ 338/28; 338/25; 374/135; 73/180

(58) Field of Classification Search .................... 338/28, 338/25, 7, 13; 374/135, 183, 185; 73/180, 73/182, 170.02
See application file for complete search history.

(56) References Cited

U.S. PATENT DOCUMENTS 4,011,756 A * 3/1977 Lemos .................... 73/204.27
5,603,571 A * 2/1997 Eckert ........................ 374/140
5,864,282 A * 1/1999 Hannigan et al. ............. 338/30
6,592,253 B2   7/2003 Nyffenegger et al.

* cited by examiner

*Primary Examiner*—Kyung Lee
(74) *Attorney, Agent, or Firm*—Tarolli, Sundheim, Covell & Tummino LLP

(57) ABSTRACT

A temperature probe assembly is provided. The temperature probe assembly may comprise a housing formed of a first thermally conductive material and having an inner diameter defined by an inner bore, an insert formed of a second thermally conductive material disposed in the inner bore and having an outer diameter that is substantially equal to the inner diameter of the housing at a first temperature and a temperature sensor mounted within the insert. The second thermally conductive material has a thermal coefficient of expansion that is greater than the first thermally conductive material, such that the insert is insertable into the inner bore at the first temperature and is tightly locked in the inner bore at a second temperature that is greater than the first temperature.

10 Claims, 2 Drawing Sheets

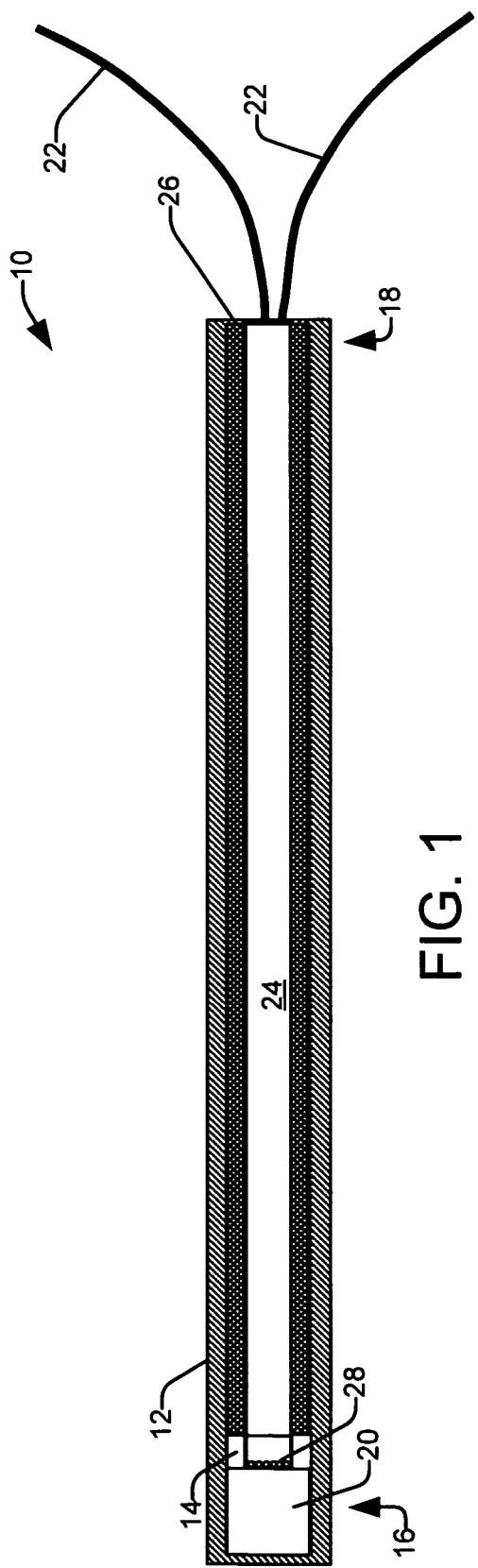
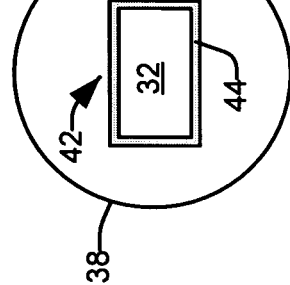
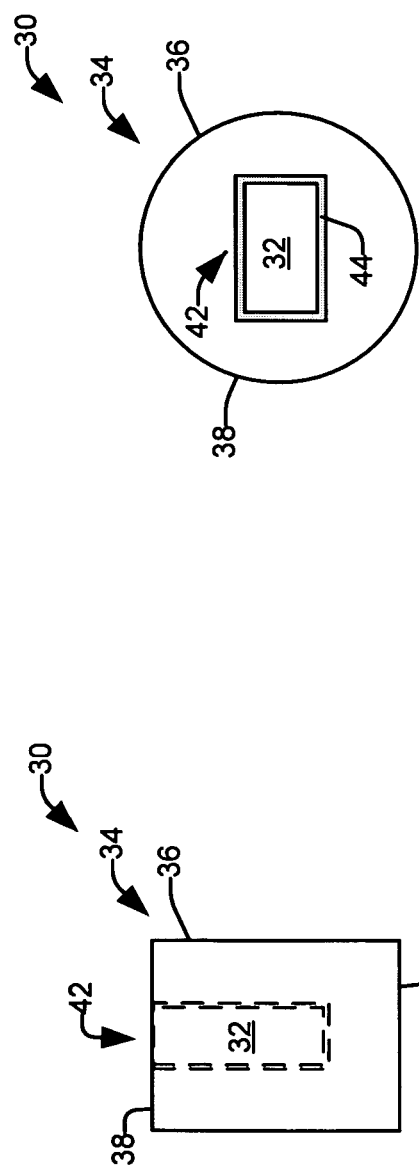

US 7,719,401 B2

TEMPERATURE PROBE AND METHOD OF MAKING THE SAME

This invention was made with Government support under Contract No. F29601-97-C-0001 awarded by Aeronautical Systems Command. The Government has certain rights in this invention.

TECHNICAL FIELD

The present invention relates generally to temperature probes, and more particularly to a temperature probe employing a resistive temperature device (RTD) element mounted within a protective housing.

BACKGROUND

Temperature probes are used in many applications for sensing the temperature of a solid, liquid or gas. For example, temperature probes are used in certain high energy laser systems to detect the temperature of basic hydrogen peroxide (BHP), iodine, chlorine and other chemicals used in the generation of the laser beam. Other applications include medical, pharmaceutical, food, chemical, aerospace and industrial applications. In certain applications, such as high energy laser systems, it is important to measure certain temperatures very accurately and very quickly.

Different classes of temperature sensors are known in the art to measure temperature. One class of temperature sensors employs resistive elements, well known to those skilled in the art. As the temperature of the element increases or decreases, the resistance of the element also increases or decreases providing an indication of the temperature change. A constant precision current signal is applied to the resistance element resulting in a voltage drop across the element proportional to its resistance and the temperature it is subjected to. The voltage is then measured to give a reading of the resistance, and thus the temperature corresponding with that particular resistance.

Known temperature probes that employ resistive elements typically have a response time (time constant) of several seconds. Particularly, when the temperature of the environment that the sensor is sensing changes, the sensor does not give the exact temperature reading for the change until more than several seconds later. The probe response time is defined herein as the time it takes the temperature sensor to respond through 63.2% of the total temperature change. This slow of a response time is unacceptable in many applications. The slow response time can be attributed to the fact that the resistive element is mounted within a protective housing that typically includes pockets of air and bonding agents between the element and the housing. The pockets of air can considerably reduce the thermal conductivity between the media and the resistive element resulting in a slower time constant of the probe.

SUMMARY

In one aspect of the invention, a temperature probe assembly is provided. The temperature probe assembly comprises a housing formed of a first thermally conductive material and having an inner diameter defined by an inner bore, an insert formed of a second thermally conductive material disposed in the inner bore and having an outer diameter that is substantially equal to the inner diameter of the housing at a first temperature and a temperature sensor mounted within the insert. The second thermally conductive material has a thermal coefficient of expansion that is greater than the first thermally conductive material, such that the insert is insertable into the inner bore at the first temperature and is tightly locked in the inner bore at a second temperature that is greater than the first temperature.

In another aspect of the invention, a method for fabricating a temperature probe assembly is provided. The method comprises forming an inner bore in a housing of a first thermally conductive material, the inner bore having an internal diameter at a first temperature, forming an insert of a second thermally conductive material having an outer diameter that is substantially equal to the internal diameter at the first temperature and an inner cavity dimensioned to house a temperature sensor, and bonding a temperature sensor in the inner cavity. The method further comprises inserting the insert into the inner bore of the housing at the first temperature to form a temperature probe assembly, and exposing the temperature probe assembly to a second temperature that is greater than the first temperature. The second thermally conductive material has a thermal coefficient of expansion that is greater than the first thermally conductive material, such that the insert is tightly locked in the inner bore at the second temperature.

In yet another aspect of the present invention, a method for fabricating a temperature probe assembly is provided. The method comprises machining an inner bore in a housing of a first thermally conductive material, the inner bore having an internal diameter at a first temperature having a range of about −40° F. (−40° C.) to about −100° F. (−73.33° C.) and machining or stamping an insert of a second thermally conductive material having an outer diameter that is substantially equal to the internal diameter at the first temperature and an inner cavity dimensioned to house a resistive temperature device (RTD) element. The method further comprises bonding the RTD element in the inner cavity, coupling signal wires to the RTD element and inserting the insert into the inner bore of the housing at the first temperature to form a temperature probe assembly. The temperature probe assembly is then exposed to a second temperature greater than or equal to about 32° F. (0° C.), wherein the second thermally conductive material has a thermal coefficient of expansion that is greater than the first thermally conductive material, such that the insert is tightly locked in the inner bore at the second temperature.

BRIEF DESCRIPTION OF THE DRAWINGS

FIG. 1 illustrates a cross-sectional view of a temperature probe assembly in accordance with an aspect of the present invention.

FIG. 2 illustrates a side view of a cylindrical insert in accordance with an aspect of the present invention.

FIG. 3 illustrates a plan view of the cylindrical insert of FIG. 2.

DETAILED DESCRIPTION

Figure 4:
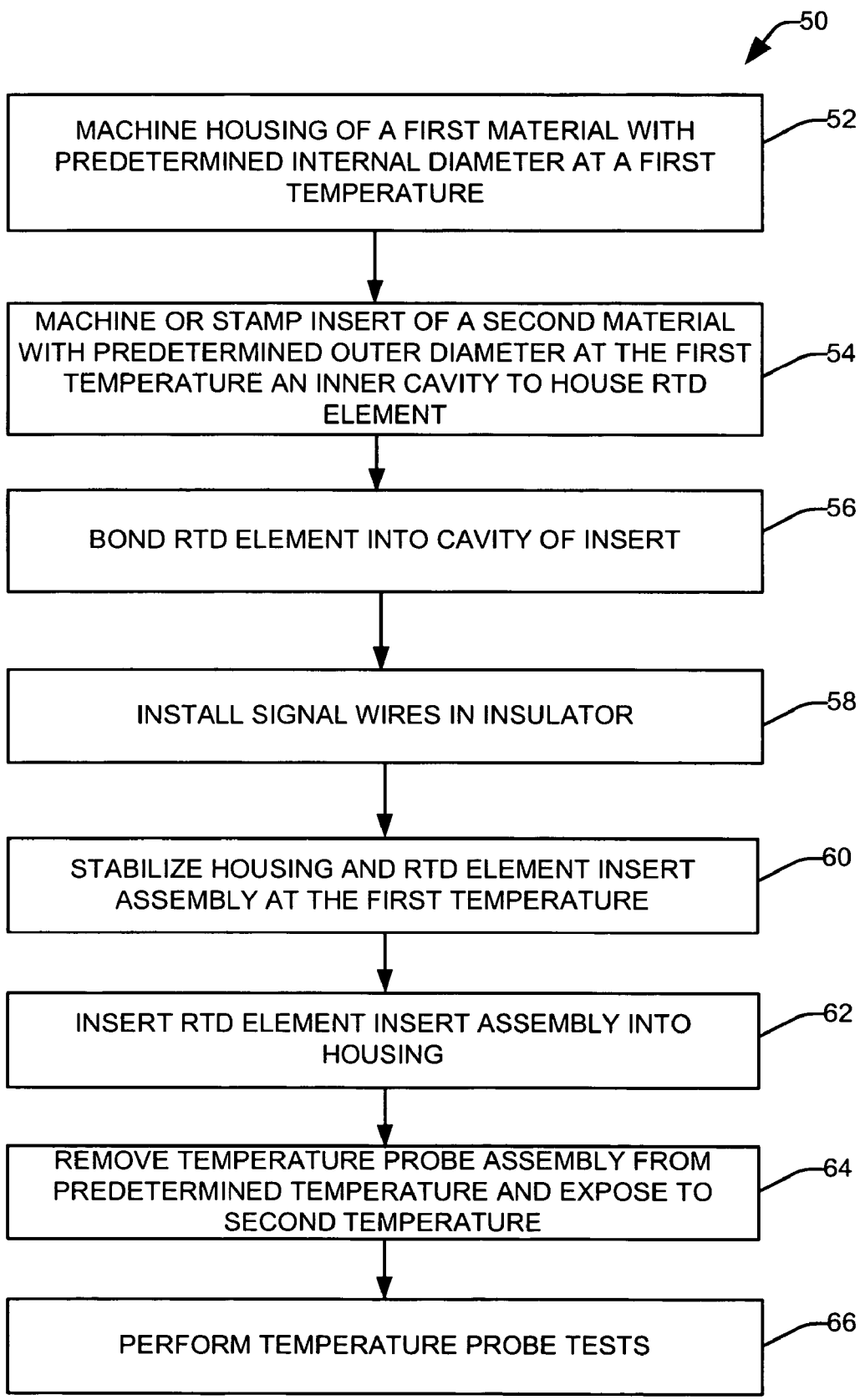
FIG. 4 illustrates a methodology for fabricating a temperature probe assembly in accordance with an aspect of the present invention.

The present invention relates to a temperature sensor probe and a method of making the same. The temperature sensor probe can be operative for measuring the temperatures of corrosive media, such as molten iodine, chlorine, ammonia, basic hydrogen peroxide and others very accurately and extremely fast without being degraded or destroyed by the media. The temperature sensor probe employs a thermally conductive insert that houses a resistive temperature device (RTD) element (e.g., a precision thin film sensor device). The thermally conductive insert can be inserted into a central longitudinal bore of a thermally conductive housing (or sheath) through an open end to a closed end of the housing to mate with an internal diameter of the housing.

Both the internal diameter of the housing and an external diameter of the insert can be machined to be of a substantially same or substantially equal diameter at a first temperature (e.g., about −40° F. (−40° C.) to about −100° F. (−73.33° C.)). The thermally conductive material of the insert is selected to have a thermal coefficient of expansion that is greater than the thermally conductive material of the housing. Therefore, the insert can be inserted into the housing at the first temperature to form a temperature probe assembly. The temperature probe assembly can then be removed from the first temperature and exposed to a second temperature (e.g., a room temperature that is greater than or equal to about 32° F. (0° C.)) that is higher than the first temperature.

As the ambient temperature rises, the insert will expand at a faster rate than the housing resulting in an extremely tight fit at elevated temperatures and a repeatable fast temperature constant. The present invention provides for high yields (e.g., 95%), fast performance (e.g., at least about 250 msec response time or faster for single probes), and substantially lower costs than current implementations. The second temperature can be selected to allow the insert to sufficiently expand and lock tightly within the housing without the need of any thermally conductive bonding agent. The second temperature should not exceed the upper temperature limit of the probe which is dictated by the upper temperature limit of the thin film RTD element. If the second temperature exceeds the upper temperature limit of the thin film RTD, the thin film RTD element may have to be recalibrated, or may be permanently damaged. A damaged element cannot be recalibrated since it may not respond linearly due to delamination between the thin film RTD element and the associated substrate.

FIG. 1 illustrates a length-wise, cross-sectional view of a temperature sensor probe 10 in accordance with an aspect of the present invention. The probe 10 includes an outer housing 12 (or sheath) defining a bore 14 therein that acts as a protective shield, and is made of a first thermally conductive material, such as inconel, stainless steel, hastelloy, copper, brass, or any variations of an alloy of inconel, stainless steel, hastelloy, copper, brass or other conductive alloy. The housing 12 is cylindrical in this example because that shape lends itself to a more desirable configuration for certain applications. Of course, in other examples, the shape of the housing 12 can be different to be more conducive for that particular application. Furthermore, the diameter, wall thickness and length of the housing 12 can be application specific. In an aspect of the invention, the housing 12 has an outer diameter of ⅛ of an inch, an internal diameter of 0.095 inches and a length of 6 inches.

The housing 12 can have a closed end 16 and an open end 18. The closed end 16 can be closed via an end cap welded to and closing off one end of the housing 12. In one aspect of the invention, the end cap has a thickness of 0.01 inches. Alternatively, the housing 12 can be a single integrated assembly with the internal diameter being machined (e.g., via an Electrical Discharge Machining (EDM) apparatus) to form the inner bore 14 from a solid cylindrical piece of material. An RTD element or a thin film sensor (e.g., thin film precision RTD element) (not shown) is mounted within an insert 20 that is inserted intimately close to the closed end 16 of the housing 12. The insert 20 can have a cylindrical shape with an inner cavity formed therein for housing the RTD element or thin film sensor.

A pair of connecting leads 22 is electrically coupled to the RTD element or thin film sensor in the insert 20, and extend therefrom. The connecting leads can be non-insulated bare wire made of 95% Au and 5% Pd. A cylindrical insulating member 24 (e.g., a ceramic insulator) is positioned within the housing 12 proximate the sensor and the insert 20 and extends the length of the housing 12, as shown. The insulating member 24 can be secured inside the housing 12 by a high temperature filler 26, which can be applied at room temperature and then cured at elevated temperature limited by the upper operational temperature of the RTD element or thin film sensor. The insulating member 24 with the embedded RTD element or thin film sensor is bonded together via a high temperature bonding agent 28 to protect and strengthen the probe 10 in severe vibration environments (e.g., up to about 20 g or higher). The leads 22 extend from the RTD element through the insulating member 24 and out of the open end 18 of the housing 12. The leads 22 can be electrically coupled to an electrical receptacle (not shown) mounted to the open end 18 to provide a constant precision current signal to the sensor within the insert 20. Although, a two wire sensor configuration is illustrated for the probe 10, it is to be appreciated that a 3-wire or 4-wire configuration can be employed for higher precision measurements.

The insert 20 is formed of a second thermally conductive material that has a thermal coefficient of expansion that is greater than the first thermally conductive material. The insert 20 provides a good thermal contact between the sensor in the insert 20 and the housing 12. The insert 20 can be formed of substantially pure silver, which provides for a good thermal conductor, as well as having a relatively high thermal coefficient of expansion. Alternatively, the insert 20 can be formed from annealed copper, gold, aluminum, tungsten, molybdenum or magnesium as long as the thermal coefficient of expansion of the insert material is greater than the thermal coefficient of expansion of the housing 12. It is to be appreciated that the type of material selected for the insert may affect the time constant proportionally to the applicable heat conduction coefficient.

The insert 20 has an outer diameter that is substantially the same or substantially equal as the internal diameter (e.g., within +/−0.0001") of the housing 12 at a first temperature. The first temperature can be, for example, a temperature that falls within a range of about −40° F. (−40° C.) to about −100° F. (−73.33° C.) (e.g., −70° F. (−56.67° C.)). Therefore, the insert 20 can be inserted snugly into the bore 14 of the housing 12 and disposed at the closed end 16 of the housing 12 when both the housing 12 and the insert 20 are subjected to the first temperature. The housing 12 and the insert 20 can then be removed from the first temperature environment (e.g., a freezer), and exposed to a second temperature environment that is higher than the first temperature environment.

As the ambient temperature rises, the insert 20 will expand at a faster rate than the housing 12 resulting in an extremely tight fit of the insert 20 in the housing 12 at elevated temperatures and provide for a repeatable fast temperature constant associated with the RTD element (e.g., pockets of air that detrimentally affect the time constant of the assembly will be effectively eliminated and there is no need for any bonding agent). The second temperature can be, for example, a room temperature that is greater than or equal to about 32 F (0° C.). The second temperature can be selected to sufficiently allow the insert 20 to expand and lock tightly within the housing 12, and not exceed the upper temperature limit of the probe 10.

FIG. 2 illustrates a front view of a cylindrical insert assembly 30 in accordance with an aspect of the invention, while FIG. 3 illustrates a plan view of the cylindrical insert assembly 30 of FIG. 2. The cylindrical insert assembly 30 includes a thin film sensor device 32 axially disposed in an inner rectangular cavity 42 at a top wall 38 of a cylindrical insert 34. The cylindrical insert 34 includes an outer cylindrical wall 36 having an outer diameter machined to be substantially a same diameter as an internal diameter of a temperature probe housing at the above mentioned first temperature. The inner rectangular cavity 42 is machined to be dimensioned to house the thin film sensor device 32 (e.g., precision thin film platinum element). The thin film sensor device 32 is placed vertically, or axially, in the inner rectangular cavity 42, and then potted and cured using a suspended silver potting compound 44. The suspended silver potting compound 44 can be similar to a compound used in U.S. Pat. No. 6,592,253, entitled, "Precision Temperature Probe Having a Fast Response", the entire contents of which are incorporated herein. It is to be appreciated that cavity 42 can be circular, but a rectangular cavity using EDM machining technology, would provide for a better fit in the shape of the thin film sensor device 32 and reduce the amount of suspended silver potting compound needed, which can affect the time constant. A bottom wall 40 defines a closed end of the cylindrical insert 34.

The closed end of the cylindrical insert 34 and the outer cylindrical wall 36 can have a surface that substantially contacts an inner bore surface of a housing of a temperature probe end of a temperature probe to facilitate temperature transfers from the temperature probe housing to the thin film sensor device 32. The thin film sensor device 32 can include a ceramic substrate on which a resistive element is mounted and covered by an insulator. In one embodiment, by way of non-limiting example, the thin film sensor device can have a thickness of 1.3 mm, a width of 2.0 mm and a length of 2.3 mm. The resistive element can be a 100 ohm platinum resistive element, but can be formed of other materials, such as platinum, nickel, nickel-iron, copper and others.

In view of the foregoing structural and functional features described above, a method will be better appreciated with reference to FIG. 4. It is to be understood and appreciated that the illustrated actions, in other embodiments, may occur in different orders and/or concurrently with other actions.

FIG. 4 illustrates a methodology 50 for fabricating a temperature probe assembly in accordance with an aspect of the present invention. At 52, a housing or sheath of a first thermally conductive material is machined to define a bore that extends through a portion of the housing with a predetermined internal diameter, for example within ±0.0001", at a first temperature. The first temperature can be, for example, a temperature that falls within a range of about −40° F. (−40° C.) to about −100° F. (−73.33° C.) (e.g., −70° F. (−56.67° C.)). The first thermally conductive material can be, for example, inconel, stainless steel, hastelloy, copper, brass, or any variations of an alloy of inconel, stainless steel, hastelloy, copper, brass or other conductive alloy. The housing can be cleaned; the internal walls of the housing electropolished; and the housing can again be cleaned to remove debris caused by the electropolishing. The outer surface of the insert can also be electropolished to ascertain an intimate and tight contact with the inner surface of the housing.

At 54, an insert of a second thermally conductive material is machined or stamped with a predetermined outer diameter at the first temperature, for example within +/−0.0001", that substantially matches the internal diameter of the housing at the first temperature. Additionally, an inner rectangular cavity is formed in the insert that is dimensioned to house a thin film precision RTD element. The second thermally conductive material has a thermal coefficient of expansion that is greater than the first thermally conductive material. The insert can be formed of silver, annealed copper, gold, aluminum, tungsten, molybdenum or magnesium as long as the thermal coefficient of expansion of the insert material is greater than the thermal coefficient of expansion of the housing. The insert can be cleaned; the outer walls of the insert electropolished; and the insert can again be cleaned to remove debris caused by the electropolishing. The outer surface of the insert can also be electropolished to ascertain an intimate and tight contact with the inner surface of the housing. The methodology 50 then proceeds to 56.

At 56, an RTD element is inserted into the cavity of the insert, bonded and cured to form an insert assembly, for example, employing a suspended silver potting compound, such as a type disclosed in U.S. Pat. No. 6,592,253, the entire contents of which is incorporated herein. The time constant of the RTD element can then be verified. At 58, the signal leads are installed through a ceramic insulator and coupled to the RTD element. At 60, the housing and the insert assembly are stabilized at the first temperature. At 62, the insert assembly with the thin film RTD element can be inserted into the bore of the housing and disposed at the bottom or closed end of the housing to form a temperature probe assembly. At 64, the temperature probe assembly is removed from the first temperature, and exposed to a second temperature that is higher than the first temperature. The second temperature can be, for example, a room temperature that is greater than or equal to about 32° F. (0° C.). The second temperature can be selected to sufficiently allow the insert to expand and lock tightly within the housing. It is to be appreciated that the upper temperature limit of the probe is dictated by the upper temperature limit of the thin film RTD element, such the thin film RTD element would have to be recalibrated if it exceeds the upper temperature limit of the probe. Other materials used for the RTD elements could include nickel, nickel-iron, copper and others.

The time constant of the RTD element can then be verified. The different coefficients of thermal expansion of the insert and the housing will positively and very tightly lock the thin film precision RTD element insert at the bottom of the housing without any trapped air pockets. The locking will tighten with increasing temperature, making the formation of minute cracks with air due to thermal shock, thermal cycling, vibration and shock very unlikely and for all practical purposes impossible. Sealing compound can then be provided to support the ceramic insulator. The time constant of the RTD element can then be verified. The methodology then proceeds to 66 to perform additional temperature probe tests, such as thermal shock and thermal cycling tests and vibration and shock tests to verify the time constant of the RTD element has not degraded as a result of temperature or vibration stresses.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A temperature probe assembly comprising:
   a housing formed of a first thermally conductive material and having an inner diameter defined by an inner bore;
   a solid insert formed of a second thermally conductive material disposed in the inner bore and having an outer diameter that is substantially equal to the inner diameter of the housing at a first temperature;

a temperature sensor mounted within the insert; and
wherein the second thermally conductive material has a thermal coefficient of expansion that is greater than the first thermally conductive material, such that the solid insert is insertable into the inner bore at the first temperature and is tightly locked in the inner bore at a second temperature that is greater than the first temperature.

2. The probe assembly of claim 1, wherein the solid insert is formed of substantially pure silver.

3. The probe assembly of claim 1, wherein the solid insert is formed of one of annealed copper, gold, aluminum, tungsten, molybdenum and magnesium.

4. The probe assembly of claim 1, wherein the housing is formed of one of any variation in alloys of inconel, stainless steel, hastelloy, copper, brass or other conductive alloy.

5. The probe assembly of claim 1, wherein the first temperature is in a range of about −40° F. (−40° C.) to about −100° F. (−73.33° C.).

6. The probe assembly of claim 5, wherein the first temperature is about 70° F. (−56.67° C.).

7. The probe assembly of claim 5, wherein the second temperature is greater than or equal to about 32° F. (0° C.).

8. The probe assembly of claim 1, wherein the housing and the solid insert have cylindrical shapes, the solid insert being disposed at one end of the housing and in thermal contact with the housing.

9. The probe assembly of claim 1, wherein the temperature sensor is a resistive temperature device (RTD) element comprised of one of platinum, nickel, nickel-iron, copper or other suitable metals.

10. The probe assembly of claim 9, wherein the RTD element is a precision thin film RTD element comprised of one of platinum, nickel, nickel-iron, copper or other suitable metals.

* * * * *